United States Patent
Wu et al.

(10) Patent No.: US 8,995,292 B2
(45) Date of Patent: Mar. 31, 2015

(54) SYSTEMS AND ETIQUETTE FOR HOME GATEWAYS USING WHITE SPACE

(75) Inventors: Shiquan Wu, Nepean (CA); Jung Yee, Ottawa (CA)

(73) Assignee: Wi-Lan, Inc., Ottawa (CA)

( * ) Notice: Subject to any disclaimer, the term of this patent is extended or adjusted under 35 U.S.C. 154(b) by 0 days.

(21) Appl. No.: 13/334,763

(22) Filed: Dec. 22, 2011

(65) Prior Publication Data

US 2012/0096498 A1     Apr. 19, 2012

Related U.S. Application Data

(63) Continuation of application No. 12/274,141, filed on Nov. 19, 2008, now Pat. No. 8,107,391.

(51) Int. Cl.
| | |
|---|---|
| *H04L 12/26* | (2006.01) |
| *H04L 27/26* | (2006.01) |
| *H04W 16/02* | (2009.01) |
| *H04W 16/14* | (2009.01) |
| *H04L 5/00* | (2006.01) |

(Continued)

(52) U.S. Cl.
CPC ............ *H04L 27/2602* (2013.01); *H04W 16/02* (2013.01); *H04W 16/14* (2013.01); *H04L 5/0007* (2013.01); *H04L 5/003* (2013.01); *H04W 24/00* (2013.01); *H04W 88/16* (2013.01)
USPC ........................................................ 370/252

(58) Field of Classification Search
CPC ..... H04W 16/14; H04W 16/02; H04W 24/00; H04W 88/16; H04L 5/0007
USPC ......... 370/235, 252, 254, 294, 329, 330, 321, 370/326, 344, 433, 401; 455/69, 67.11, 455/101, 449, 450, 550.1, 561
See application file for complete search history.

(56) References Cited

U.S. PATENT DOCUMENTS

| 4,750,036 A | 6/1988 | Martinez |
| 5,956,642 A * | 9/1999 | Larsson et al. ................ 455/449 |
| 6,327,300 B1 | 12/2001 | Souissi et al. |

(Continued)

FOREIGN PATENT DOCUMENTS

| CA | 1981500 A | 6/2007 |
| CN | 1481509 A | 3/2004 |

(Continued)

OTHER PUBLICATIONS

Iancu, D., et al. Analog Television, WiMax and DVB-H on the Same SoC Platform.

(Continued)

*Primary Examiner* — Ajay Cattungal
(74) *Attorney, Agent, or Firm* — Procopio, Cory, Hargreaves & Savitch LLP

(57) ABSTRACT

Methods and systems for sharing white space with primary services and other emerging services are provided. Signal distribution within a specified location, such as a dwelling, is performed using a home gateway that identifies unused white space, reserves such white space spectrum, and delivers data to one or more devices at the respective location using the reserved spectrum. Signalling between the devices and the gateway is performed over a shared signalling channel, which enables the gateway to advise the devices from where and when to receive data. The gateway also uses a common spectrum reservation OFDM symbol to advise the neighbouring gateways of the local spectrum reservation.

17 Claims, 7 Drawing Sheets

(51) Int. Cl.
*H04W 24/00* (2009.01)
*H04W 88/16* (2009.01)

(56) References Cited

U.S. PATENT DOCUMENTS

| | | | |
|---|---|---|---|
| 6,385,434 | B1 | 5/2002 | Chuprun et al. |
| 6,389,088 | B1* | 5/2002 | Blois et al. .................. 375/355 |
| 6,505,032 | B1 | 1/2003 | McCorkle et al. |
| 6,700,939 | B1 | 3/2004 | McCorkle et al. |
| 6,735,238 | B1 | 5/2004 | McCorkle |
| 6,859,506 | B1 | 2/2005 | McCorkle |
| 6,901,112 | B2 | 5/2005 | McCorkle et al. |
| 6,909,877 | B2 | 6/2005 | Rofheart et al. |
| 6,912,372 | B2 | 6/2005 | McCorkle et al. |
| 6,931,078 | B2 | 8/2005 | McCorkle et al. |
| 7,079,604 | B1 | 7/2006 | Miller et al. |
| 7,177,341 | B2 | 2/2007 | McCorkle |
| 7,292,622 | B2 | 11/2007 | McCorkle |
| 7,627,056 | B1 | 12/2009 | Harris et al. |
| 7,668,262 | B2 | 2/2010 | Woo et al. |
| 7,689,186 | B2 | 3/2010 | Matoba et al. |
| 7,710,919 | B2 | 5/2010 | Woo et al. |
| 7,852,868 | B2 | 12/2010 | Gardner et al. |
| 7,865,170 | B2 | 1/2011 | Altizer et al. |
| 7,876,869 | B1 | 1/2011 | Gupta |
| 7,969,311 | B2 | 6/2011 | Markhovsky et al. |
| 8,081,997 | B2 | 12/2011 | Sambhwani et al. |
| 8,150,328 | B2 | 4/2012 | Chaudhri et al. |
| 8,305,917 | B2 | 11/2012 | Ahuja et al. |
| 2001/0032225 | A1* | 10/2001 | Tal et al. .................. 708/300 |
| 2002/0086707 | A1* | 7/2002 | Struhsaker et al. ........... 455/561 |
| 2003/0021295 | A1 | 1/2003 | Sahinoglu et al. |
| 2003/0031191 | A1* | 2/2003 | El Wardani et al. ......... 370/401 |
| 2003/0096631 | A1* | 5/2003 | Kayama et al. ............... 455/522 |
| 2004/0052228 | A1 | 3/2004 | Tellado et al. |
| 2004/0085892 | A1 | 5/2004 | Walton et al. |
| 2005/0152478 | A1 | 7/2005 | Jalloul et al. |
| 2005/0156775 | A1 | 7/2005 | Petre et al. |
| 2005/0254442 | A1* | 11/2005 | Proctor et al. ................. 370/294 |
| 2005/0286788 | A1 | 12/2005 | Orr |
| 2006/0008016 | A1 | 1/2006 | Balakrishnan et al. |
| 2006/0067354 | A1* | 3/2006 | Waltho et al. ............... 370/433 |
| 2006/0083205 | A1 | 4/2006 | Buddhikot et al. |
| 2006/0128428 | A1 | 6/2006 | Rooyen |
| 2006/0203794 | A1* | 9/2006 | Sampath et al. ............. 370/344 |
| 2006/0215606 | A1* | 9/2006 | Yeon et al. .................. 370/329 |
| 2007/0087700 | A1* | 4/2007 | Tanida ......................... 455/101 |
| 2007/0091998 | A1 | 4/2007 | Woo et al. |
| 2007/0100922 | A1 | 5/2007 | Ashish |
| 2007/0115878 | A1 | 5/2007 | Ashish et al. |
| 2007/0117537 | A1 | 5/2007 | Hui et al. |
| 2007/0133387 | A1 | 6/2007 | Arslan et al. |
| 2007/0183591 | A1 | 8/2007 | Geile et al. |
| 2007/0200727 | A1* | 8/2007 | Sakamoto ................ 340/825.25 |
| 2007/0202867 | A1 | 8/2007 | Waltho et al. |
| 2007/0223582 | A1 | 9/2007 | Borer |
| 2007/0249341 | A1 | 10/2007 | Chu et al. |
| 2007/0253394 | A1 | 11/2007 | Horiguchi et al. |
| 2008/0004839 | A1 | 1/2008 | Papadimitriou et al. |
| 2008/0010208 | A1 | 1/2008 | Callaway |
| 2008/0075191 | A1* | 3/2008 | Haartsen ..................... 375/285 |
| 2008/0080604 | A1 | 4/2008 | Hur et al. |
| 2008/0086286 | A1 | 4/2008 | Shellhammer |
| 2008/0086749 | A1 | 4/2008 | Goldberg et al. |
| 2008/0089281 | A1 | 4/2008 | Yoon et al. |
| 2008/0089306 | A1 | 4/2008 | Hu |
| 2008/0102822 | A1 | 5/2008 | Feng et al. |
| 2008/0108366 | A1 | 5/2008 | Hu |
| 2008/0112427 | A1 | 5/2008 | Seidel et al. |
| 2008/0112467 | A1 | 5/2008 | Shellhammer |
| 2008/0130519 | A1* | 6/2008 | Bahl et al. ..................... 370/254 |
| 2008/0165680 | A1 | 7/2008 | Chang |
| 2008/0165754 | A1 | 7/2008 | Hu |
| 2008/0166974 | A1 | 7/2008 | Teo et al. |
| 2008/0192686 | A1 | 8/2008 | Cho et al. |
| 2008/0207136 | A1 | 8/2008 | Tang et al. |
| 2008/0207204 | A1 | 8/2008 | Vlantis et al. |
| 2008/0212725 | A1 | 9/2008 | Tang |
| 2008/0259859 | A1 | 10/2008 | Cordeiro et al. |
| 2008/0261639 | A1 | 10/2008 | Sun et al. |
| 2008/0268832 | A1 | 10/2008 | Peng |
| 2008/0268892 | A1 | 10/2008 | Hamdi et al. |
| 2008/0293353 | A1* | 11/2008 | Mody et al. ....................... 455/1 |
| 2008/0293410 | A1 | 11/2008 | Chan et al. |
| 2008/0299918 | A1 | 12/2008 | Jallon |
| 2008/0305750 | A1 | 12/2008 | Alon et al. |
| 2009/0060001 | A1 | 3/2009 | Waltho |
| 2009/0061779 | A1 | 3/2009 | Gurney et al. |
| 2009/0061887 | A1* | 3/2009 | Hart et al. ..................... 455/450 |
| 2009/0067354 | A1 | 3/2009 | Gao |
| 2009/0080389 | A1 | 3/2009 | Messerges et al. |
| 2009/0086618 | A1 | 4/2009 | Muschallik et al. |
| 2009/0124208 | A1 | 5/2009 | Mody et al. |
| 2009/0144791 | A1 | 6/2009 | Huffman et al. |
| 2009/0196180 | A1* | 8/2009 | Bahl et al. ..................... 370/235 |
| 2009/0197627 | A1 | 8/2009 | Kuffner et al. |
| 2009/0235316 | A1* | 9/2009 | Wu et al. ......................... 725/81 |
| 2009/0247201 | A1 | 10/2009 | Ye et al. |
| 2009/0296751 | A1* | 12/2009 | Kewitsch et al. ............... 372/18 |
| 2009/0323835 | A1 | 12/2009 | Rao et al. |
| 2010/0045876 | A1 | 2/2010 | Gao et al. |
| 2010/0069013 | A1 | 3/2010 | Chaudhri et al. |
| 2010/0075611 | A1* | 3/2010 | Budampati et al. ......... 455/67.11 |
| 2010/0075704 | A1* | 3/2010 | McHenry et al. ............. 455/509 |
| 2010/0091919 | A1 | 4/2010 | Xu et al. |
| 2010/0119016 | A1* | 5/2010 | Ghosh ............................ 375/340 |
| 2010/0124254 | A1 | 5/2010 | Wu et al. |
| 2010/0137014 | A1 | 6/2010 | Rao et al. |
| 2010/0166053 | A1 | 7/2010 | Fukuhara et al. |
| 2010/0254489 | A1* | 10/2010 | Citta ............................... 375/299 |
| 2010/0309317 | A1 | 12/2010 | Wu et al. |
| 2010/0311341 | A1 | 12/2010 | Gaddam et al. |
| 2011/0002309 | A1 | 1/2011 | Park et al. |
| 2011/0043710 | A1 | 2/2011 | Samarasooriya et al. |
| 2011/0150105 | A1 | 6/2011 | Koga et al. |
| 2012/0212628 | A1* | 8/2012 | Wu et al. ........................ 348/192 |
| 2013/0023285 | A1* | 1/2013 | Markhovsky et al. ...... 455/456.1 |
| 2013/0045754 | A1* | 2/2013 | Markhovsky et al. ...... 455/456.1 |

FOREIGN PATENT DOCUMENTS

| | | |
|---|---|---|
| CN | 1677970 A | 10/2005 |
| CN | 1777167 A | 5/2006 |
| CN | 1791170 A | 6/2006 |
| CN | 1842178 A | 10/2006 |
| CN | 1878011 A | 12/2006 |
| CN | 1941762 A | 4/2007 |
| CN | 1981506 A | 6/2007 |
| CN | 101262702 A | 9/2008 |
| CN | 101292486 A | 10/2008 |
| EP | 1 750 466 A1 | 2/2007 |
| EP | 1845636 A1 | 10/2007 |
| EP | 2680630 A1 | 1/2014 |
| JP | 11-275165 | 10/1999 |
| JP | 2000-175110 A | 6/2000 |
| JP | 2002-529018 A | 9/2002 |
| JP | 2005-057644 | 3/2005 |
| JP | 2005-522061 | 7/2005 |
| JP | 2007-036490 | 2/2007 |
| JP | 2007-036491 | 2/2007 |
| JP | 2007-081860 A | 3/2007 |
| JP | 2007-166068 | 6/2007 |
| JP | 2007-166488 A | 6/2007 |
| JP | 2007150971 A | 6/2007 |
| JP | 2007-300419 A | 11/2007 |
| JP | 2008507900 A | 3/2008 |
| JP | 2008-172760 A | 7/2008 |
| JP | 2008-533913 A | 8/2008 |
| JP | 2008-259106 A | 10/2008 |
| JP | 2008545285 A | 12/2008 |
| WO | 0223758 A1 | 3/2002 |
| WO | 2006/046424 A1 | 5/2006 |
| WO | 2007043827 A1 | 4/2007 |
| WO | 2007049760 A1 | 5/2007 |

(56) References Cited

FOREIGN PATENT DOCUMENTS

| WO | 2007053196 A1 | 5/2007 |
|---|---|---|
| WO | 2007056020 A1 | 5/2007 |
| WO | 2007056081 A1 | 5/2007 |
| WO | 2007060493 A2 | 5/2007 |
| WO | 2007081503 A1 | 7/2007 |
| WO | 2007094604 A1 | 8/2007 |
| WO | 2007096819 A2 | 8/2007 |
| WO | 2007100323 A1 | 9/2007 |
| WO | 2007122297 A1 | 11/2007 |
| WO | 2008013429 A2 | 1/2008 |
| WO | 2008014293 A1 | 1/2008 |
| WO | 2008032999 A2 | 3/2008 |
| WO | 2008038207 A2 | 4/2008 |
| WO | 2008060203 A1 | 5/2008 |
| WO | 2008086243 A1 | 7/2008 |
| WO | 2008090509 A2 | 7/2008 |
| WO | 2008096921 A1 | 8/2008 |
| WO | 2008097253 A1 | 8/2008 |
| WO | 2008107854 A1 | 9/2008 |
| WO | 2008109641 A2 | 9/2008 |
| WO | 2008114216 A2 | 9/2008 |
| WO | 2008/129716 A1 | 10/2008 |
| WO | 2008140417 A1 | 11/2008 |
| WO | 2008144323 A1 | 11/2008 |
| WO | 2009/018300 A1 | 2/2009 |
| WO | 2009114931 A1 | 9/2009 |

OTHER PUBLICATIONS

Stevenson. "IEEE starts standard to tap open regions in the TV spectrum for wireless broadband services." Oct. 12, 2004. http://standards.ieee.org/announcements/pr_80222.html, 3 pages.
International Search Report and Written Opinion as issued in International Patent Application No. PCT/CA2010/000126 on May 5, 2010, 8 pages.
International Search Report and Written Opinion as issued in International Patent Application No. PCT/CA2010/000823 on Oct. 26, 2010, 11 pages.
International Search Report and Written Opinion as issued in International Patent Application No. PCT/CA2010/000856 on Sep. 14, 2010, 8 pages.
International Search Report and Written Opinion for PCT/CA2009/000371, issued May 29, 2009, 9 pages.
International Search Report and Written Opinion from PCT/CA2009/001664 dated Feb. 1, 2010, 8 pages.
International Search Report and Written Opinion issued Dec. 17, 2009 in PCT/CA2009/001392, 6 pages.
Jones et al. "Initial Evaluation of the Performance of Prototype TV-Band White Space Devices." OET Report, FCC/OET 07-TR-1006, Tech. Rsch Br. Lab. Div. Office.,Jul. 31, 2007 in 85 pages.
Liang, et al. "Cognitive Radio on TV Bands: A New Approach to Provide Wireless Connectivity for Rural Areas." Wireless Technologies Advances for Emergency and Rural Communications. 2008 IEEE Wireless Communications, Jun. 2008, pp. 16-22.
Marcus et al. "Report of the Unlicensed Devices and Experimental Licenses Working Group", Federal Communications Commission Spectrum Policy Task Force. Nov. 15, 2002. Internet Wayback Machine capture http://replay.waybackmachine.org/20041119020032/http://www.fcc.gov/sptf/files/E&UWGFinalReport.doc, Nov. 19, 2004, 24 pages.
Motorola et al., IEEE 802.22-06/0005r5, PHY Overview, Mar. 2006, 21 pages.
Narlanka, S. et al. A Hardware Platform for Utilizing TV Bands with a Wi-Fi Radio, Microsoft Research, Microsoft Corp., Redmond, USA, 5 pages.
Naveen, M.B., et al. WiMAX, pp. 1-20, http://ece-www.colorado.edu/~Liue/teaching/comm_standards/WiMax/WiMax_802_16e . . . .
Rhodes, C., Where are the White Spaces in the TV Broadcast Spectrum? May 17, 2008 at National Translator Association pp. 1-19.

Iancu, D., et al. "Analog Television, WiMax and DVB-H on the Same SoC Platform." Proceedings of the International Symposium on System-on-Chip, Tampere, Finland. Nov. 2006.
Narlanka, S. et al. "A Hardware Platform for Utilizing TV Bands with a Wi-Fi Radio." 15th IEEE Workshop on Local & Metropolitan Networks, Jun. 10-13, 2007, pp. 49-53.
Naveen, M.B., et al. WiMAX. Jul. 14, 2008. pp. 1-20, http://ece-www.colorado.edu/~liue/teaching/comm_standards/WiMax/WiMax_802_16e . . . .
Office Action and Search Report (with translation) for related CN Patent Application No. 201080003588.6, dated Jul. 1, 2013, in 7 pages.
Extended European Search Report for EP 10735465.6, dated Nov. 8, 2012, in 7 pages.
Extended European Search Report for related EP Patent Application No. 10785619.7 dated May 17, 2013 in 12 pages.
Wu et al. "Spectrum Manager White Paper: 22-09-0113-00-0000-spectrum-manager-white-paper." IEEE Draft. Piscataway, NJ, US. vol. 802.22. Jun. 19, 2009, pp. 1-13. XP017656573, retrieved on Jun. 19, 2009.
Ecclesine. "IEEE 802 Ofcom Comments: 18-09-0054-06-0000-ieee-802-ofcom-comments." IEEE Draft. Piscataway, NJ, US. vol. 802.18, No. 6. May 1, 2009, pp. 1-11. XP017662465, retrieved on May 1, 2009.
Office Action and English translation for related JP Patent Application No. 2011-503315, dated Apr. 16, 2013, in 4 pages.
Office Action and Search Report (with translation) for related CN Patent Application No. 200980142699.2, dated Jun. 3, 2013, in 11 pages.
Kim et al. "A CR Platform for Applications in TV Whitespace Spectrum." Cognitive Radio Oriented Wireless Networks and Communications. IEEE 3rd International Conference, Piscataway, NJ. 2008. pp. 1-8.
Depardo et al. "Quantifying the Impact of Unlicensed Devices on Digital TV Receivers." Retrieved from http://www.newamerica.net/files/NAF%20Spectrum%20Technical%20Report%20_FINALSUBMITTED_0.pdf. Accessed on Apr. 24, 2013. pp. 1-29, Jan. 31, 2007.
Office Action and Search Report for related CN Patent Application No. 200980134967.6 dated May 6, 2013 in 9 pages.
Extended European Search Report for related EP Patent Application No. EP 09817150.7 dated May 14, 2013 in 7 pages.
Oh et al. "White-Space Sensing Device for Detecting Vacant Channels in TV Bands." Proc. Crowncom, Singapore, May 2008.
Office Action and Search Report (with English translation) for related TW Patent Application No. 099116618, dated Aug. 15, 2013, in 8 pages.
Office Action with English Translation for related JP Patent Application No. 2011-535848, dated Oct. 22, 2013, in 4 pages.
Office Action with English Translation for related JP Patent Application No. 2012-182904, dated Oct. 22, 2013, in 6 pages.
Akyildiz et al. "NeXt generation/dynamic spectrum access/cognitive radio wireless networks: A survey." Computer Networks. 50(13):2127-2159, Sep. 15, 2006.
Extended European Search Report for EP Patent Application No. 09827082.0, mailed on Dec. 12, 2013, in 12 pages.
IEEE 802.22 Working Group of the LAN/MAN Standards Committee. "IEEE P802.22 ™/DRAFTv1.0: Draft Standard for Wireless Regional Area Networks Part 22: Cognitive Wireless RAN Medium Access Control (MAC) and Physical Layer (PHY) specifications: Policies and procedures for operation in the TV Bands." Apr. 8, 2008, 426 pages.
Office Action for related CN Patent Application No. 2010800226756 dated Dec. 30, 2013 in 8 pages.
Office Action and translation for related JP Patent Application No. 2012-513425, dated Feb. 10, 2014 in 4 pages.
"White Space", [online], Jan. 30, 2009 Examination Committee related to General Legal Systems for Communication and Broadcasting (12th), Materials 6, Ministry of Internal Affairs and Communications, (searched Jul. 11, 2013) Internet/URL:http:www.soumu.go.jp/main_sosiki/joho_tsusin/policyreports/joho_tsusin\houtai\pdf\090130_1_s6.pdf. Reference is made in relation

(56) References Cited

OTHER PUBLICATIONS to journal material to http:www.soumu.go.jp/main_sosiki/joho_tsusin/policyreports/joho_tsusin\houtai\090130_1.html. English translation unavailable.

Cordeiro et al. "IEEE 802.22: An Introduction to the First Wireless Standard based on Cognitive Radios." Journal of Communications. 1(1):38-47 (Apr. 2006).

Office Action (with English translation) dated Apr. 28, 2014 for related JP Patent Application No. 2012-513420 in 10 pages.

Sasaki. "Trends on Standardization Activities in IEEE802.22", Technical Research Bulletin of the Institute of Electronics, Information and Communication Engineers. 106(395):127-133 (Nov. 22, 2006). English abstract provided.

Decision of Rejection for related JP Patent Application No. 2012-182904, mailed on May 8, 2014, in 6 pages (with English translation).

IEEE Computer Society and the IEEE Microwave Theory and Techniques Society. "802.16. IEEE Standard for Local and Metropolitan Area Networks. Part 16: Air Interface for Fixed Broadband Wireless Access Systems." Oct. 1, 2004, 3 pages.

* cited by examiner

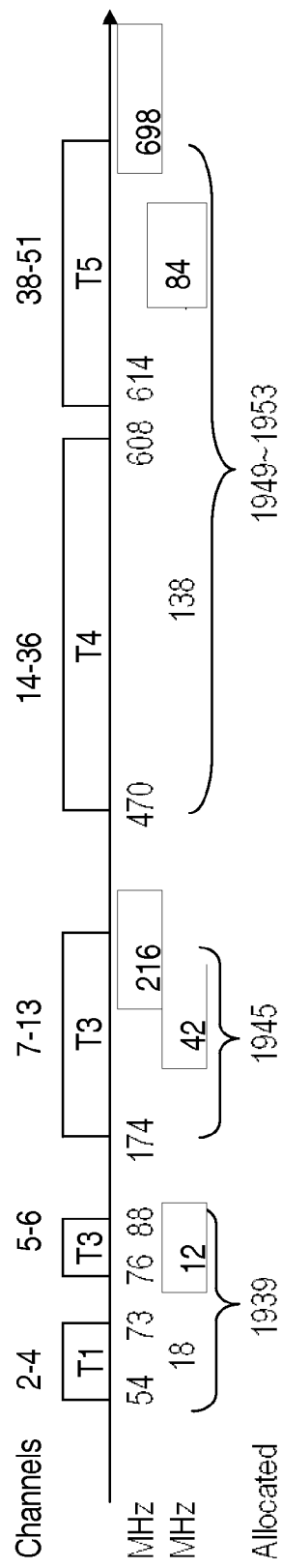
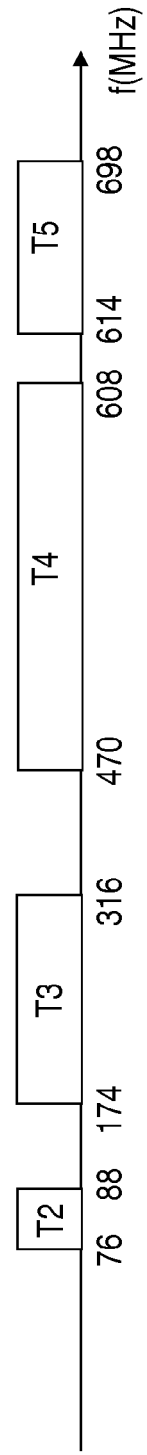
FIGURE 1A (Prior Art)
FIGURE 1B

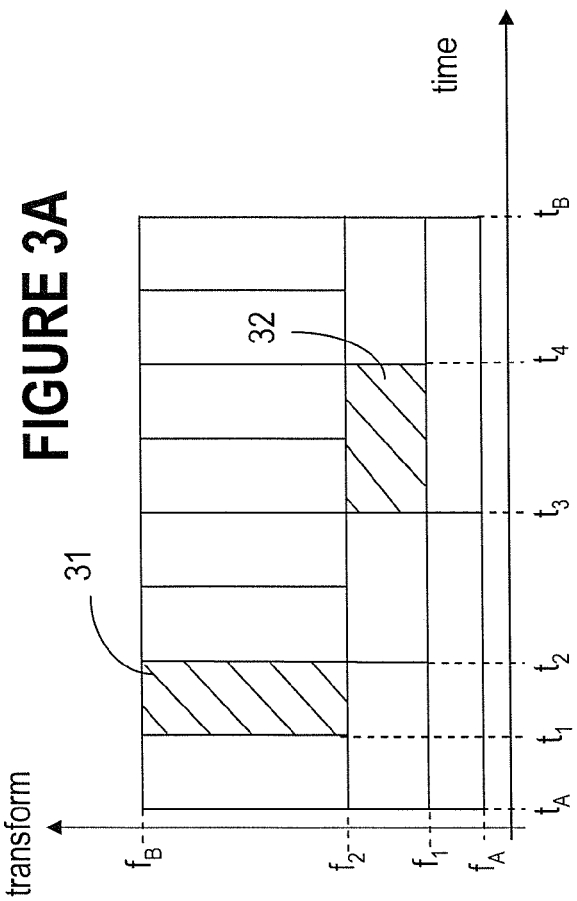
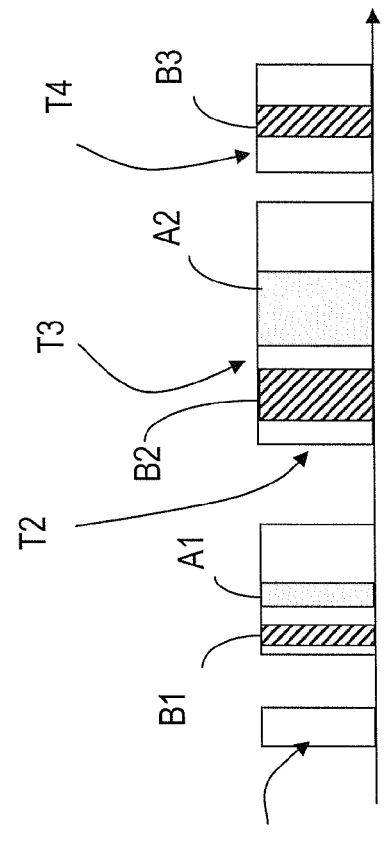
FIGURE 3A
FIGURE 3B
User A    A1 + A2 = 6MHz
User B    B1+ B2 + B3 = 6MHz

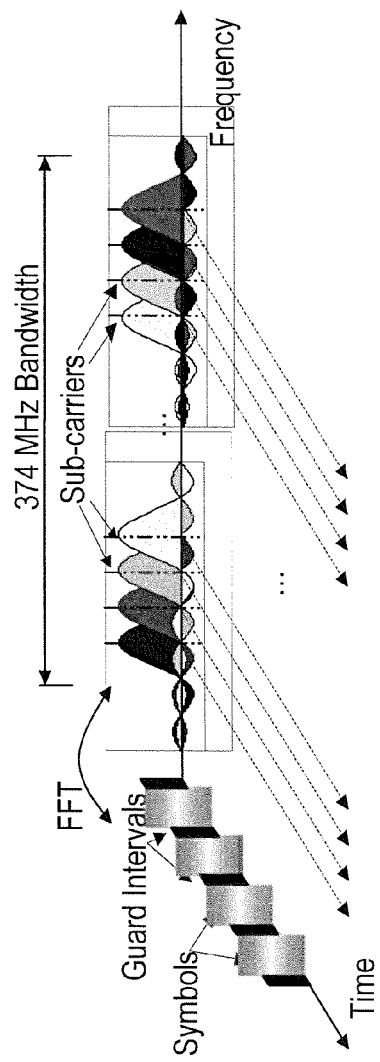
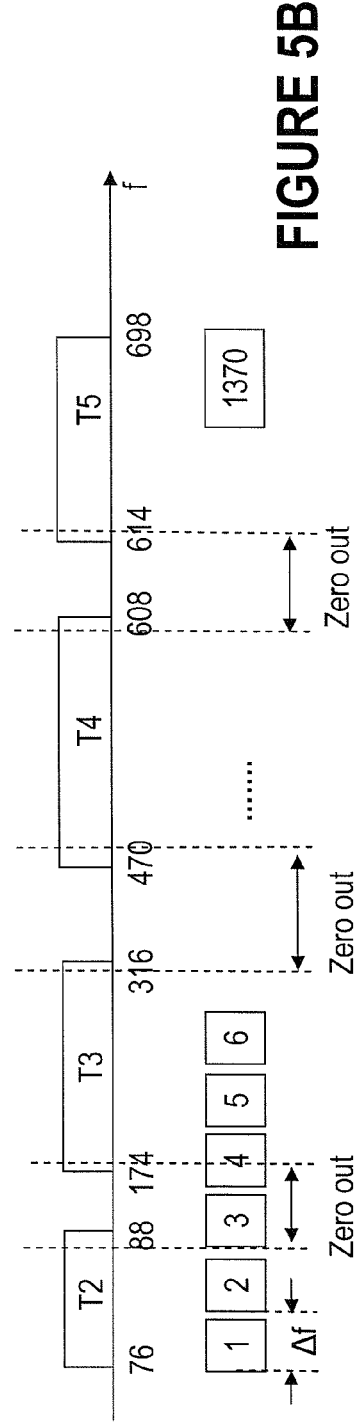
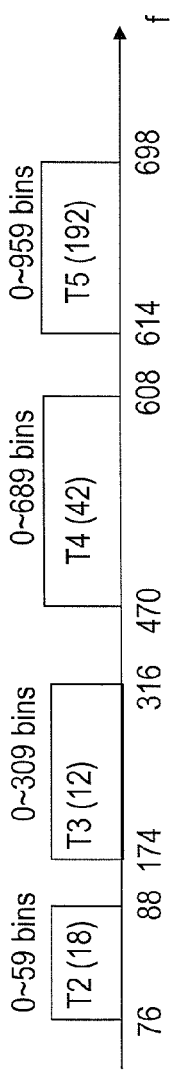
FIGURE 5A
FIGURE 5B
FIGURE 5C (Gateway)**

(Device)**

SYSTEMS AND ETIQUETTE FOR HOME GATEWAYS USING WHITE SPACE

RELATED APPLICATIONS

This patent application is a continuation of U.S. patent application Ser. No. 12/274,141, entitled "SYSTEMS AND ETIQUETTE FOR HOME GATEWAYS USING WHITE SPACE," filed Nov. 19, 2008, which is incorporated herein by reference.

FIELD OF THE INVENTION

This invention relates generally to distribution of data signals over white space, and more particularly to a system and etiquette for using the white space freed within a specified TV market by conversion from analog to digital TV (DTV) systems.

BACKGROUND

The beginning of the 21st century viewed a significant development of user wireless terminals for both fixed and mobile environments. For example, the modern PCs (personal computers) and notebooks (laptops) are enabled with wireless connections to allow for some mobility and reduce the wiring between the components of the PC. Home LAN convergence rapidly integrates home routers, wireless access points and DSL modems to connect home computers to a subscribed Internet service. In response to the growing demand for broadband connection to user premises, a worldwide trend became apparent, namely a move from analog to digital TV Digital (DTV). DTV has several advantages over analog TV. Thus, DTV is more flexible and efficient than analog television; it enables special services such as multiplexing (more than one program on the same channel), electronic program guides and additional languages, spoken or subtitled. Another significant advantage of the DTV is that the digital channels take up less bandwidth and provide a better performance. This means that digital broadcasters can provide high definition (HDTV) services, with higher-quality images and sound. The sale of non-television services may also provide an additional revenue source.

In the US, the FCC mandated transition to digital TV (DTV). Conversion to DTV results in important bandwidth becoming free in the VHF (very high frequency) and/or the lower part of the UHF (ultra high frequency) spectrum, used currently by TV broadcasters. As each TV station operating in a certain geographic region/area (TV market) uses only a limited number of channels from the TV band, some digital channels remain unused by broadcasters in the respective area: this locally available spectrum is called "white space".

For example, in the United States there are roughly 210 TV broadcast markets and 1700 TV broadcasting stations. Currently, each TV station is assigned around eight radio frequency (RF) channels for NTSC broadcast, each channel occupying 6 MHz in the VHF/UHF spectrum. The Federal Communications Commission (FCC) has mandated that all full-power television broadcasts will use the Advanced Television Systems Committee (ATSC) standards for digital TV by no later than Feb. 17, 2009. These developments open the way to providing a variety of new, dedicated services to individual/family subscribers. The FCC intends to allocate channels 2 through 51 to digital TV; channels 52 through 69 that occupy the lower half of the 700 MHz band have already been reallocated through auction to various advanced commercial wireless services for consumers. When transition DTV ends in early 2009, every one of the 210 TV markets in the US will have 15 to 40 unassigned (vacant) channels reserved for broadcasting, but not in use. Vacant TV channels are perfectly suited for other unlicensed wireless Internet services. Access to vacant TV channels facilitates a market for low-cost, high-capacity, mobile wireless broadband networks, including the emerging in-building networks. Using this white space, the wireless broadband industry could deliver Internet access to every household for as little as $10 a month by some estimates.

Currently, most flat panel HDTV sets still use cablings to connect to set top box or other devices such as DVDs, Blu-eRay devices or VCRs. The cabling requirements limit the flexibility of HDTV installation and the appearance. So, there is a market demand to find solutions that eliminate or minimize use of cables. Some companies proposed wireless HDTV solutions in the 60 GHz spectrum, whereby delivering raw data wirelessly to the HDMI port, which is a standard HDTV interface. Although there is some progress in this area, the performance and cost of this solution still poses design and operational challenges.

On Oct. 15, 2008, the FCC's engineering office released a report that spells out the rules the devices must meet in order to use the white space, the main requirement being not to interfere with the primary services active in the respective area. Thus, the signals radiated by any white space device operating in the ATSC spectrum must follow the FCC regulations so that the quality of the primary services such as TV broadcast, wireless microphones, or other emerging services already deployed or which will be deployed in that area will not be degraded by these new services. The new white space devices should be designed so as to not affect the TV tuner sensitivity and the TV receiver performance specified by the Advanced Television Systems Committee (ATSC) standards. The specification uses the term "white space etiquette" for this set of regulations that must be accounted for when designing and using white space devices. For conformity with these requirements, FCC requires both fixed and portable devices to include geolocation capabilities and use an FCC database of TV signals and location of venues such as stadiums and churches that use wireless microphones. These database and geolocation capabilities would, in theory, prevent interference with broadcast TV stations and wireless microphones and ensure compliance with FCC rules.

The mobile industry is considering using the white space by developing standards on technologies convergence into an architecture that is comfortable, easy to use and attractively priced. For example, the IEEE 802.22 Working Group, formed in 2004, received the mandate to develop a standard for Wireless Regional Area Networks (WRAN). The mission for this technology is to provide rural area broadband services to single-family residential, multi-dwelling units, small office/home office, small businesses, etc. The standard will be used by license-exempt devices in the spectrum allocated to the TV broadcast service on a non-interfering basis. The 802.22 draft specifies that the network should operate in a point to multipoint configuration, where an outdoor installed access point (AP) will control the medium access for all the customer premise equipment attached to it, while avoiding interference with the broadcast services. One key feature of the WRAN APs is the capability to perform a distributed spectrum sensing, where the customer premises equipment will be sensing the spectrum and will be sending periodic reports to the serving AP informing it about what they sensed. Based on the information gathered, the AP will evaluate whether a change is necessary in the channel utilized, or conversely, if it should stay transmitting and receiving over the same one. OFDMA is proposed as the modulation scheme for transmission in uplink and downlink. Channel bonding is also specified for cases when higher bit rates and distances are needed.

However, the 802.22 draft proposes use of the white space only in chunks of 6 MHz (the width of a TV channel specified by the ATSC standard) and does not allow for finer granularity. Also, it requires high power transmissions in both base stations and terminals so as to cover an area with a 30 km radius. This results in inefficient use of bandwidth (which is a valuable resource) for the case when only a portion of a 6 MHz channel is actually needed. For instance, when a wireless microphone application occupies a few hundreds kHz bandwidth from a 6 MHz piece of spectrum, the reminder of the 6 MHz may be wasted. As well, the bandwidth resources may be inefficiently utilized when the broadband market is in populated areas such as homes or shopping malls etc.

Therefore, there is a need to provide an inexpensive and efficient way to broadcast multimedia content within a specified area using wireless solutions. There is also a need to set overall rules (etiquette) on how to use the white space spectrum that is reserved but not used by the primary services in a certain area, without affecting operation of the existent services.

SUMMARY OF THE INVENTION

It is an object of the invention to provide methods and systems for identifying and using the white space available in a specified location for delivering broadband services over a home network. The present invention provides efficient ways to detect the white space and also efficient ways to utilize and share the white space.

Another object of the invention is to provide methods and systems for delivering broadband services to users over a home network, without degrading the quality of the primary services, such as TV broadcast, digital microphone and other services active in the respective area.

Accordingly, the invention provides a system for redistributing data signals to wireless enabled devices located within a specified area, comprising: a spectrum detector for identifying a white space channel including one or more pieces of spectrum that are not currently used in the specified area; a data distribution unit adapted to receive, process and distribute to devices it serves, information signals received from a variety of sources over the white space channel; and a control channel processor for providing a shared signalling channel for enabling signalling between the wireless enabled device and the data distribution unit.

The invention also provides a method for redistributing data signals to wireless enabled devices located within a specified area, comprising: a) establishing a shared signalling channel over a piece of spectrum that is not currently used in the specified area; b) on receipt of a service request from a device transmitted over the shared signalling channel, establishing a white space channel using one or more pieces of spectrum that are not currently used in the specified area; c) distributing an information signal over the white space channel to the device; and d) controlling transfer of the information signal to the device by exchanging control messages over the shared signalling channel.

Still further, is directed to a method for redistributing data signals to wireless enabled devices located within a specified area served by a gateway, comprising: a) on receipt of service requests from one or more devices, identifying a corresponding number of white space channels within the spectrum that is not currently used in the specified area; b) reserving the white space allocated to the white space channels identified in the specified area; c) broadcasting a white space allocation message for advertising to all neighbouring gateways the current channel allocation in the specified area; and d) distributing the information signals over the white space channels to the respective devices.

Advantageously, the invention provides an efficient way of identifying pieces of white space in a specified area and using this white space for delivering secondary services to subscribers present in that area. By complying with the etiquette proposed by the invention for white space use, the scanning and detection operation becomes simple, and therefore practical and cost effective. The systems and methods of the invention are also providing ways to using the identified white space in such a way so as to not interfere with the services already active in the respective area.

Another advantage of the method and systems of the invention is that it allows for a simpler, cost effective design of white space devices. This invention also provides a practical way for cognitive white space device implementation.

BRIEF DESCRIPTION OF THE DRAWINGS

The invention is next described with reference to the following drawings, where like reference numerals designate corresponding parts throughout the several views.

FIG. 1A shows the ATSC broadcast band;

FIG. 1B illustrates the four bands where white space spectrum may become available;

FIG. 3A illustrates use of wavelets for identifying white space according to an embodiment of the invention;

FIG. 3B shows examples of white space allocation per users;

FIG. 5A illustrates an embodiment of a common spectrum reservation OFDM symbol used by the gateways to advise the spectrum reservation status to neighbouring gateways;

FIG. 5B shows the common spectrum reservation OFDM symbol in the frequency domain;

FIG. 5C illustrates an example of how pieces of white space can be identified using bin indexing, according to an embodiment of the invention;

DESCRIPTION OF THE EMBODIMENTS OF THE INVENTION

Figure 2:
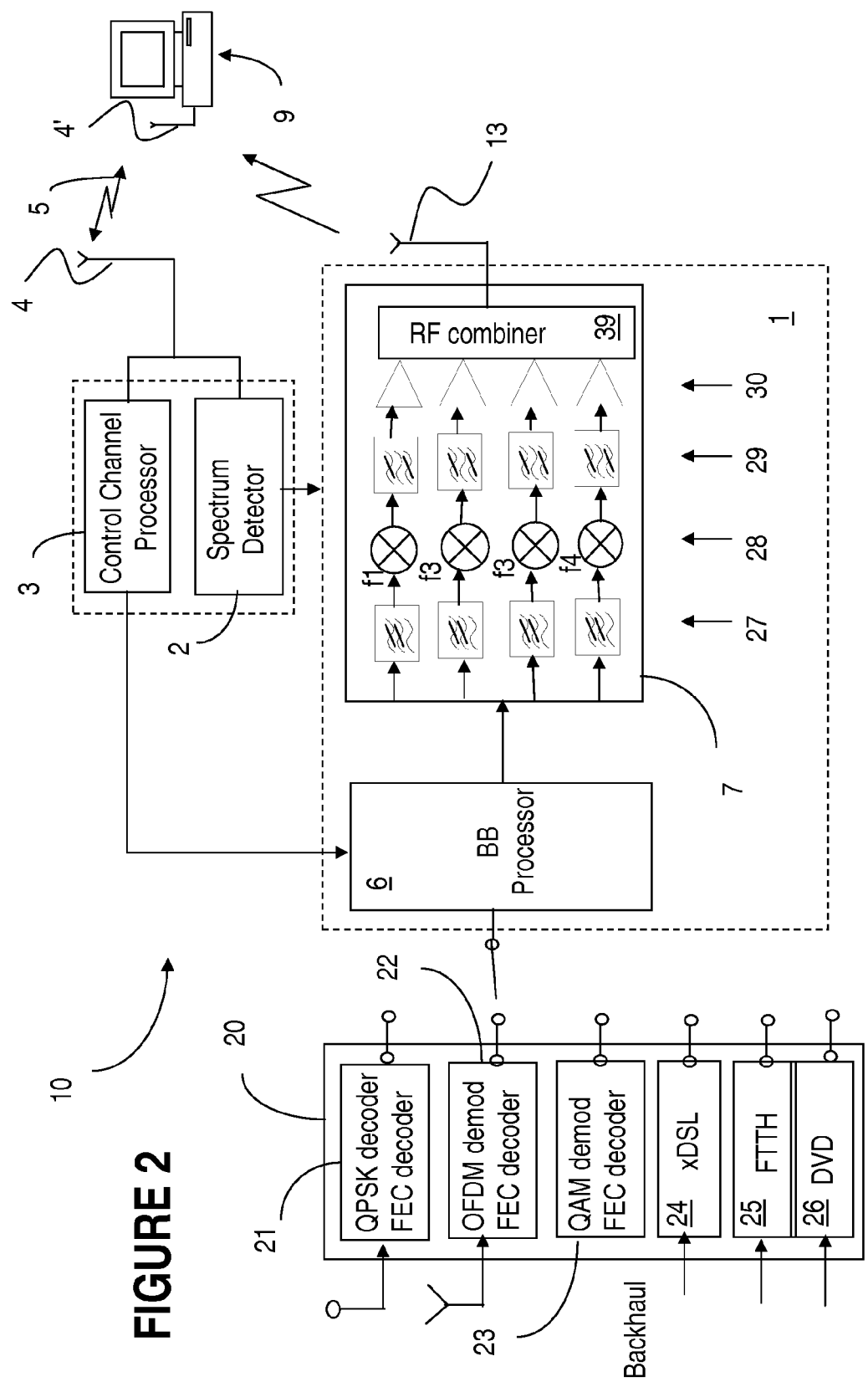
FIG. 2 shows a block diagram of a system for distributing multimedia data to subscribers at a specified location according to an embodiment of the invention.

In this specification, the term "primary services" is used for DTV broadcast, wireless microphone and any other applications that are entitled by regulations to use a specified portion of the spectrum. As indicated above, each TV station operating in a certain geographic region/area uses only a limited number of channels from the spectrum allocated to the DTV, such that some pieces of spectrum (contiguous or not) remain unused in the respective area: this locally available spectrum is called "white space". Thus, the white space differs from TV market to TV market; the term "specified area" or "location" is used to designate a particular area such as single or multi-dwelling units, small office/home office, small businesses, multi-tenant buildings, public and private campuses, etc located in a certain TV market. The term "home network" refers to a wireless network serving such an area.

The present invention provides methods and systems for distribution of data signals in a specified area, and more particularly to a system and etiquette for using any available white space. In particular, the description refers to the white space freed within such an area by the conversion from analog to DTV broadcast, and uses as an example the North America ATSC standards; however, the methods and systems described here are also applicable to other jurisdictions, standards and/or parts of the spectrum. For example, a DTV channel in Japan occupies 8 MHz and the width of a DTV channel in European countries is 7 MHz. The invention is not restricted to identifying unused pieces of spectrum 6 MHz wide (the width of an ATSC channel); applying the techniques described here, narrower or larger pieces of unused spectrum may be considered. For example, if a portion of a 6 MHz piece of white space is occupied by a wireless microphone, the remaining part of that 6 MHz piece of spectrum can also be used according to this invention. Still further, the invention is described in connection with local wireless TV broadcast, but same principles are applicable to other types of signal distribution in the white space, and the white space need not necessarily be in the VHF/UHF bands.

Turning to the North America example, the ATSC standards mandate a bandwidth of 6 MHz for each TV channel, use of Trellis Eight—Vestigial Side Band (8-VSB) modulation, and Reed-Solomon encoding. The TV receiver has some basic requirements to properly decode the ATSC signal and provide good quality TV pictures. These requirements include a Signal to Noise Ratio (SNR) no less than 15 dB or equivalently, a bit error rate (BER) no worse than $3 \times 10^{-6}$, a thermal noise floor of −106.2 dBm (dBm is the abbreviation for the power ratio measurement units), and a sensitivity between −81 and −84 dBm, etc. Any secondary service contending for the white space available in a certain area must comply to a certain etiquette so as to not interfere with the primary services (TV broadcast, wireless microphone, etc).

Referring now to the drawings, FIG. 1A illustrates the US digital television broadcast spectrum after Feb. 17, 2009, showing five bands denoted with T1-T5. Band T1 occupied by ATSC channels 2-4 has 18 MHz, extending from 54 MHz to 72 MHz. Band T2 occupied by channels 5-6 has 12 MHz between 76 MHz to 88 MHz, band T3 occupied by channels 7-13 has 42 MHz between 174 MHz and 216 MHz. Further, band T4 carrying channels 14-36 occupies 138 MHz, extending from 470 MHz to 608 MHz and band T5 occupied by channels 38-51 has 84 MHz, from 614 MHz to 698 MHz. Thus, this group of 49 ATSC channels covers a total spectrum of 294 MHz (18+12+42+138+84).

Since channels 2, 3, and 4 will be reserved for some specific applications, after this reservation, the commercial ATSC TV channels will encompass 274 MHz, ranging from 76 MHz to 698 MHz, as shown on FIG. 1B by bands T2-T5.

FIG. 2 shows a block diagram of a system for distributing multimedia data to subscribers at a specified location according to an embodiment of the invention. The system includes a gateway 10, which is preferably a home gateway, which broadcasts TV signals inside a home to a device 9. Device 9 is a wireless enabled data device; while FIG. 2 shows a computer, it is to be understood that device 9 can equally be a digital TV set provided with a set-top box, or any other device that enables a user to select, access and view multimedia content (e.g. TV programming, movies, games, etc). It is also to be noted that this invention enables use of conventional TV sets, with no changes required to the tuner. In general terms, gateway 10 comprises a data distribution unit 1, a spectrum detector 2 a control channel processor 3 and a backhaul interface 20. This Figure also shows the components of the data distribution unit 1, namely, a baseband processor 6 and a distributor 7.

Spectrum detector 2 is used to sense the white space available in the respective area (see above definition) over a part of the wireless communication spectrum (licensed or not) and provide this information to distributor unit 1. The part of the wireless communication spectrum over which the white space is sensed is preferably preset when the system is installed, to a certain part or parts of the spectrum that are known to be underutilized in a certain region. For example, it may include the spectrum freed by transition from analog to digital TV, or parts of the unlicensed spectrum (e.g. 2.4 GHz and 5 GHz bands used by WiFi). As another example, it can include the entire VHF/UHF spectrum. Spectrum detector 2 senses the wireless signals present in the scanned spectrum, using an antenna 4.

The control channel processor 3 is used for enabling the devices to communicate with the distribution unit 1 over a shared signalling channel, denoted with 5 on FIG. 2. Signalling channel 5 enables establishment of a master-slave relationship between the gateway and the devices it serves. By using this signalling channel, the gateway controls operation of the devices in conformity with the white space etiquette. In turn, the shared signalling channel is used by all devices served by distribution unit for connection set-up (as a rendezvous channel), for communicating to unit 1 information such as access requests, bandwidth requests, etc, as known to persons skilled in the art. Antenna 4 is used for transmitting the control information to the devices over the signalling channel 5 and for receiving the service requests and status information from the devices over channel 5. In the embodiment shown in FIG. 2, the channel processor 3 and spectrum detector 2 share antenna 4, but embodiments with different antennae for these operations are also possible.

Data distribution unit 1 receives the user signals from various sources and transmits these to the device 9 over the white space identified by the spectrum detector 2; antenna unit 13 is used for transmitting the data to the devices. As indicated above, parameters of the information signal transmitted by the unit 1 are designed so as to not interfere with the primary services present in the respective area. In general terms, the power of the information signal is very low, the carrier frequency and the band of the signals are selected in parts of the spectrum that are not currently used by other services, and the transmission is synchronized to the ATSC broadcast.

The operation of the spectrum detector 2 is described in connection with FIGS. 3A and 3B. As indicated above, spectrum detector 2 scans selected part of the wireless communication spectrum. As an example, the parts of interest could be the bands T2-T5 allocated to DTV. The searched spectrum may be further defied in each TV market based on the tables (available) with the regional allocation of TV channels. Since each TV market uses a maximum of 12 TV channels (i.e. 72 MHz), it is very likely that more than 200 MHz of white space will be available in any particular location. If a look-up table with the locally allocated TV channels is provided at the gateway, the gateway may exclude the spectrum occupied by these channels from the scan; if not, gateway 10 scans the entire TV spectrum.

The spectrum analyzing operation involves scanning a spectrum of interest for sensing (detecting) any signals occupying that spectrum, analyzing the sensed signals and identifying the pieces of spectrum that are not currently occupied; in other words, detecting pieces of white space. The term "current spectrum occupancy" refers here to the spectrum that is currently allocated to various primary services, or used by any active secondary service. Spectrum analyzing is repeated at regular intervals, as the spectrum occupancy varies arbitrarily with wireless devices being connected/disconnected to/from the gateway, so that the spectrum detector 2 enables the gateway to know at all times of the spectrum occupancy at the respective location.

Spectrum detector 2 may be a spectrum analyzer of any kind. For example, a preferred embodiment of the invention uses a wavelet spectrum analyzer as described in the co-pending patent application U.S. patent application Ser. No. 12/078,979 identified above. FIG. 3A illustrates use of wavelets for identifying white space according to an embodiment of the invention; FIG. 3B shows examples of white space allocations per users. A wavelet spectrum analyzer/detector uses a frequency and time map, which is divided into frequency-time cells, as shown in FIG. 3A at 31 and 32. Using wavelet signal analysis, signal energy within each of the frequency-time cells is measured in order to identify frequency-time cells with little or no detectable signal activity. The frequency-time cells identified as unused provide an opportunity for use by the secondary services.

Another feature of the wavelet spectrum detector 2 is that the size of the frequency-time cells can be adjusted for finer or coarser granularity, in both time and frequency. For example, the time-frequency cells 31, 32 have different time and frequency dimensions: in FIG. 3A, cell 31 may provide a piece of free spectrum with a bandwidth $\Delta f = f_B - f_2$, for a duration of time $\Delta T = t_2 - t_1$; cell 32 may provide another a piece of free spectrum with a bandwidth $\Delta f = f_2 - f_1$, for a duration of time $\Delta T = t_4 - t_3$. As the frequency-time cells identified as usable (free) change in time and frequency, the selection of communication channels by the gateway 10 is "dynamic". As the frequency-time cells identified as usable (free) change also in size, detection of white space and selection of the communication channels by the gateway is also "adaptive". By identifying "smaller" frequency-time cells with no detectable signal activity, the home network may take advantage of instances within a communication spectrum where a certain spectrum can be shared in both frequency and time domains. It also enables identifying more than one piece of spectrum for use by a new service, when only one piece of spectrum is insufficient for the respective service.

FIG. 3B shows examples of white space allocations per user. For example, in order to obtain 6 MHz for broadcasting a TV channel to a user A, spectrum analyzer 2 scans the spectrum and identifies a 2 MHz piece of white space in T2, denoted with A1 and 4 MHz of white space in T3, denoted with A2 (note that the width of the identified spectrum is exaggerated in FIG. 3B for better illustrating the example). As another example, if 1 MHz is available in band T3, shown by B1, 3 MHz are available in T4 shown as B2, and 2 MHz are available in T5 shown as B3, a user B will receive a TV broadcast from the gateway on a white space channel including all three pieces of spectrum B1, B2 and B3. Still another example, not shown, is when the piece of spectrum identified by the gateway for a certain receiver has 6 MHz in which case the white space channel is made of one piece of spectrum only.

The dynamic and adaptive attributes of the wireless spectrum allocation method and system of the invention make it quite different from the conventional wireless spectrum allocation schemes. First, conventional wireless communications RF channels are usually pre-designed in that the transmission channels are allocated either in frequency in (FDMA systems), in time (TDMA systems), both in frequency and time (OFDMA), or in codes (CDMA systems). But, it is well known that wireless devices use a piece of spectrum and release it when communication is completed, so that spectrum utilization is not ideal when the allocation is pre-designed, as some pieces of spectrum may be idle during some periods of times, while some devices cannot gain access to this idle spectrum. Furthermore, in conventional systems, for enabling multiple users to share a piece of spectrum, the bandwidth and waveforms need to be pre-designed so as to keep the channels well separated to reduce the interference. For example the GSM systems, which can accommodate simultaneously more than 8 calls within a 200 kHz channel, use a Gaussian-like waveform. WCDMA systems have a 5 MHz channel bandwidth and a chip rate of 3.84 Mcps and use a radio resource controller (RRC) with a roll off factor 0.22, WiFi OFDM systems have a bandwidth 20 MHz and use rectangular pulses, etc.

To summarize, the channels established between the gateway 10 and devices 9 according to the invention change dynamically in time, frequency and size. To distinguish these channels from the conventional ones, the specification uses the term "TV channel" for the DTV channels and the term "white space channel" for a logical channel formed by one or more pieces of spectrum identified by gateway 10 and allocated to a certain device for a respective secondary service: it can include a piece of white space spectrum or a plurality of pieces bonded together, the white space of spectrum, the pieces being consecutive or not.

Figure 4A:
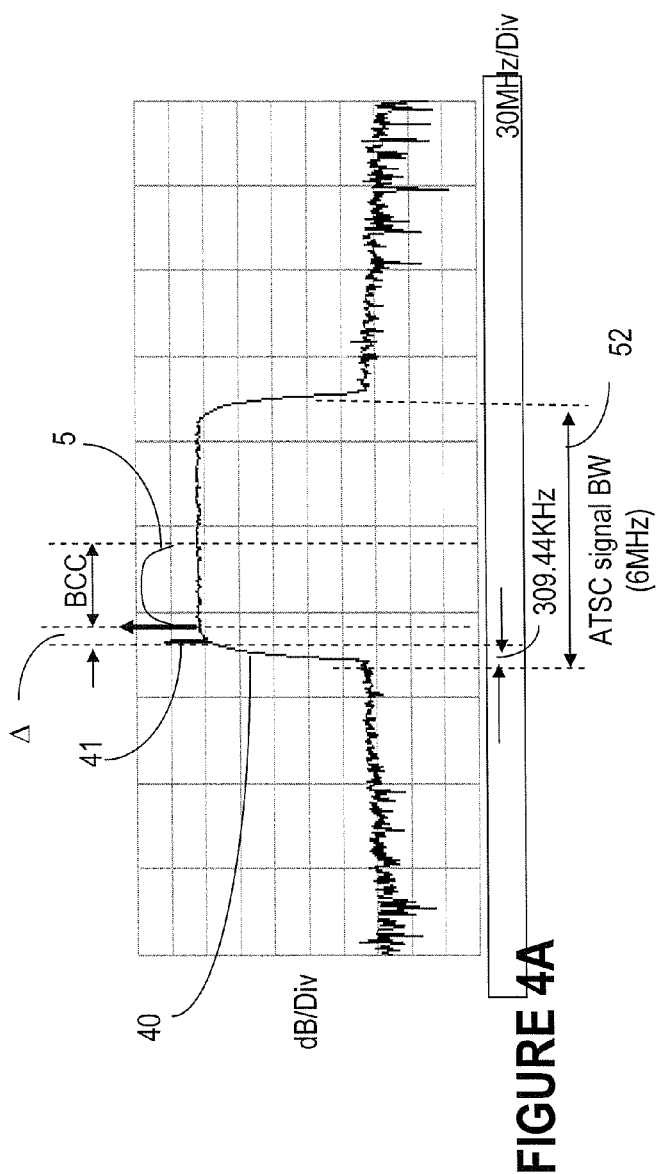
FIG. 4A illustrates the spectrum used by a signalling channel according to an embodiment of the invention.
Figure 4B:
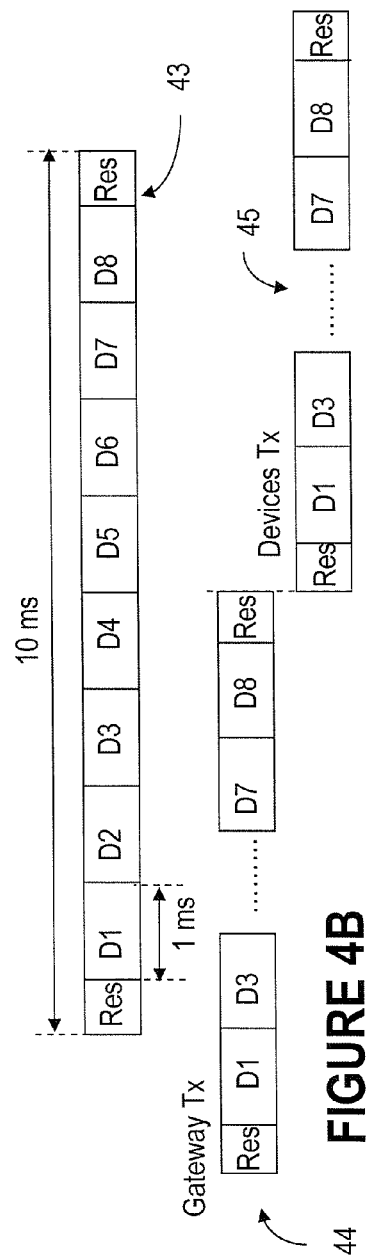
FIG. 4B shows an example of a TDD frame that may be used for the signalling channel.

The signalling channel, used for enabling proper operation of the devices served by gateway 10, is described in connection with FIGS. 4A and 4B. The gateway starts transmitting this channel from the moment it is turned on; this enables the devices 9 to look for the gateway, connect to it, request and receive services and monitor the channel for further instructions. FIG. 4A illustrates selection of the shared signalling channel according to an embodiment of the invention, and FIG. 4B shows an example of a TDD frame that may be used for the shared signalling channel.

Gateway 10 selects the shared signalling channel (or signalling channel or rendezvous channel) 5 in the white space. As seen in FIG. 4A, the signalling channel 5 is selected in a fixed relationship with the left edge of a respective unoccupied DTV channel, as shown by Δ on FIG. 4A and may occupy for example 300 kHz. Once the gateway is synchronized to the DTV broadcast, synchronization is maintained for all data transmitted to the devices it serves. For example, the signalling channel 5 of the invention may be set at for 500 kHz from the ATSC pilot 41 (the ATSC pilot is designed to be transmitted at 309.44 kHz from the start of a TV channel). It is noted here that this is just an example, and other arrangements can be equally used. Thus, the carrier frequency for the signaling channel may be in a pre-selected relationship with a frequency mark defined by the ATSC specification, such as for example the beginning of an ATSC channel reserved but not used in the spectrum portion of interest. It is also to be noted that the ATSC signal 40 in FIG. 4A is shown only for illustrating how the gateway is synchronized to the ATSC broadcast; no ATSC signal is in fact present in the spectrum where the control channel is established. To summarize, according to the invention, is a narrow (e.g. 300 kHz), low power channel established over the air between the gateway antenna 4 and device's antenna 4'. The signalling channel 5 is selected into a specified part of the white space spectrum, so that the device does not need to scan large portions of the spectrum; this will reduce complexity of the device scanner.

Channel 5 may be a TDD channel, shared by the devices that are on. Since the spectrum occupied by this channel is small, the shared signalling channel may be transmitted using a small portion of spectrum in TV channels 2, 3 or 4, or any 6 MHz TV channel that is not in use. Alternatively, the signalling channel 43 may be transmitted within the guard band between the ATSC channels, while maintaining the fixed relationship with the ATSC pilot 41.

The width of the signalling channel may be set based on the number of devices served by the gateway 10. For example a 300 kHz wide channel may be shared by eight devices. As the white space otherwise occupied by an active TV channel is much larger (6 MHz), the reminder of white space may be used by the gateway for other services.

FIG. 4B shows an example of an embodiment of the frame 43 of such a bidirectional shared signalling channel. In this example, as the channel is 300 kHz wide, the resulting speed is roughly 300/600 bits/ms for a BPSK or QPSK modulation. The frame 43 has 10×1 ms slots, for a frame duration of 10 ms. Of the 10 slots, 8 slots are allocated to the devices, and the first and the last are reserved for general control data. The information in the header of a frame identifies this as the signalling channel. As seen in the lower part of FIG. 4B, out of two consecutive frames, frame 44 is broadcast by the gateway 10 to all devices D1-D8; each device receives and processes the data from the slot that is addressed to it. The next frame denoted with 45 carries data transmitted by the devices to the gateway, in sequential order. It is noted that this is just an example of the signalling channel and that numerous other embodiment of this channel may be equally used.

When gateway 10 receives a connection request from a device 9, it selects a white space channel on which to broadcast to device 9. The white space channels are allocated based on the available spectrum sensed by the detector 2, and takes into account the bandwidth necessary for the requested service. Once the white space channel is selected, the gateway informs device 9 on the parameters of this channel (frequency, time, size) over the signalling channel, and starts broadcasting data to the device/s.

Returning now to FIG. 2, backhaul interface 20 comprises a plurality of interfaces 21-26 that receive user signals from various sources. The interfaces include the respective demodulators and error correctors that decode and process the source signals of various formats into a baseband signal that carries the user data. For example, interface 20 may include a Quadrature Phase-Shift Keying/Forward Error Correction (QPSK/FEC) decoder 21, an Orthogonal Frequency-Division Multiplexing/FEC (OFDM/FEC) decoder 22, a Quadrature Amplitude Modulation/FEC (QAM/FEC) decoder 23, a Digital Subscriber Line (xDSL) unit 24, a Fiber To The Home (FTTH) unit 25, and a Digital Versatile Disc (DVD) unit 26. Interfaces 21-26 are known to the persons skilled in the art and therefore are not described in further details here. It is however to be noted that interfaces 21-26 preferably do not perform any MPEG decoding to keep the data rate below 30 Mbps and reduce the cost.

A particular signal source 21-26 is selectively coupled to the baseband (BB) processor 6. For the example of a North American type gateway, BB processor 6 converts the signals to ATSC standard signals to ensure compatibility of the signals broadcast by the gateway with ATSC equipment at the user end. The signal is then provided to distributor 7 that up-converts the BB signal received from processor 6 on the respective white-space channel/s detected by spectrum detector 2, and transmits the signal to the devices 9.

Distributor 7 is shown with four branches, each for a certain carrier frequency f1-f4 in the embodiment of FIG. 2, illustrating baseband filters 27, mixers 28, filters 29 and amplifiers 30. The components of distributor 7 are merely one possible structure. Distributor 7 may be replaced by a suitably designed equivalent, as will be apparent to those of skill in the art. The number of branches used for distribution of the signal to device 9 is also a design parameter; a maximum of four branches is preferred, but the invention is not limited to this number.

At any time, it is possible that less than four branches of the distributor are used for transmission to a device 9. For the example of user B of FIG. 3B, since the white space channel allocated to device 9 includes pieces of white space B1, B2 and B3, distributor 7 uses only three of the four branches. In this case, let's say that f1 is the carrier frequency in B1, f2 is the carrier frequency in B2, and f3 is the carrier frequency in B3. The baseband signal, let's call it S, is de-multiplexed by processor 6 into three component signals s1, s2 and s3 according to the available bandwidth B1, B2 and B3, and each component is transmitted along one of the branches. The components are first filtered by filters 27, then mixed with the respective carrier f1, f2 and f3 in modulators 28 and further shaped by filters 29, to obtain a respective RF component S1, S2 and S3. Next, S1, S2 and S3, amplified as shown at 30, are combined in a RF combiner 39 for transmission, after being preferably OFDMA modulated.

For the example shown in FIG. 3B where the white space is provided by two pieces of spectrum A1 and A2, if A1 and A2 have the same bandwidth, a transmitter diversity scheme can be achieved by transmitting the same signal via both branches, in which case two antennae are provided by antenna unit 13; the receiver may thus obtain a higher gain by manipulating the amplitude, phase and symbol pattern of the two received signals. As another example, when the gateway identifies 6 MHz of white space in one piece, only one branch of the distributor 7 is used for broadcasting an ATSC channel.

As indicated above, the present invention also provides for a common spectrum reservation message, which is shown in FIG. 5A. This message informs the neighbouring gateways of the spectrum reservations made by each gateway 10. In this way, the white space spectrum already reserved in the respective area is known at all times to all gateways operating in the respective area. Each home gateway transmits the reservation message at predefined time intervals using a common OFDM symbol. The common spectrum reservation OFDM symbol carries spectrum usage information and further refines the available spectrum by detecting incumbent systems and devices.

As an example, the common spectrum reservation OFDM symbol uses a sub-carrier spacing $\Delta f$, and has a size N for the Fourier transform (DFT). In a preferred embodiment, $\Delta f=200$ kHz and N=1370. The length of the cyclic prefix (CP) is selected to compensate for the delay spread among the neighbouring gateways (to allow multipath to settle before the main data arrives). FIG. 5B shows how the common spectrum reservation OFDM symbol is designed for the above example where $\Delta f=200$ kHz, N=1370, and the spectrum under consideration is the VHF/UHF band, between 76 and 698 MHz. As seen, "zero's" are transmitted in the intervals between bands T2-T3; T3-T4; T4-T5; while a transmitted zero does not modulate anything, it raises the noise level so that it still can be detected (i.e. still some decoding is possible).

FIG. 5C illustrates an example of how the spectrum of interest is divided into bins, for enabling the gateways to identify and indicate any piece of spectrum using a bin index. Bins in one of bands T2, T3, T4 or T5 can be identified using the first 2 bits of the index (for four bands). For example, the bins in T2 could be identified by a 00 value for the bin index, the bins in T3 by a 01 value, in T4 by a 10 value, and in T5 by a 11 value. As the width of the bands T2-T5 is different, each of the bands T2 to T5 will need to use a different number of bins. Thus, based on a Δf=200 kHz (granularity of the pieces of spectrum to be allocated to the secondary services) band T2 requires 6 bits to identify 59 bins, band T3 requires 8 bits to identify 309 bins, band T4 requires 10 bits to identify 689 bins and band T5 also requires 10 bits to identify 959 bins. In order to obtain the 6 MHz needed for broadcasting a TV channel, and using the above exemplary granularity of Δf=200 kHz, the gateway must identify 30 bins, which results in an index of 2 bits (for identifying T2-T5)+30×10 bits (for identifying the bins in the largest of T2-T5)=302 bits for the worst case scenario.

The bin indexing method may be used for identifying pieces of white space in other transmission bands than VHF/UHF. As well, other ways of identifying the white space may also be envisaged.

Devices 9, shown generically in FIG. 2 as a computer with an antenna 4', are equipped with a scanner that detects the shared signalling channel upon turn-on and look to it. As indicated above, use of the shared signalling channel enables the devices to receive control information from the control channel processor 3 and to transmit to the control channel processor 3 service requests and status information. Device 9 also receives the high rate data channel from the gateway, over the air interface established between the gateway antenna 13 and device's antenna 4'. No changes to the device tuner are needed when the data is transmitted in the TV spectrum and MPEG format.

Figure 6A:
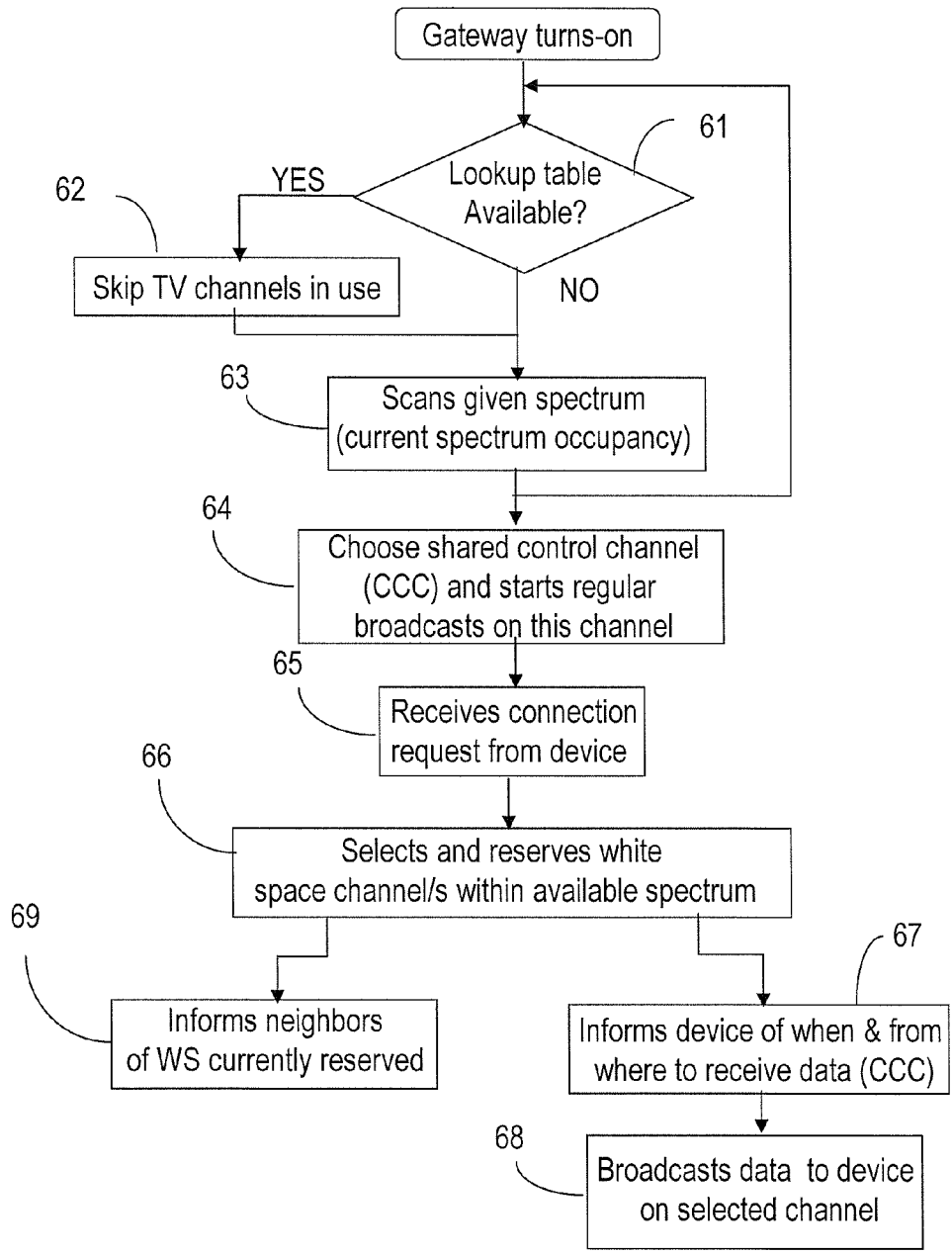
FIG. 6A is a flowchart of the method according to an embodiment of the invention, showing the steps performed by the gateway.
Figure 6B:
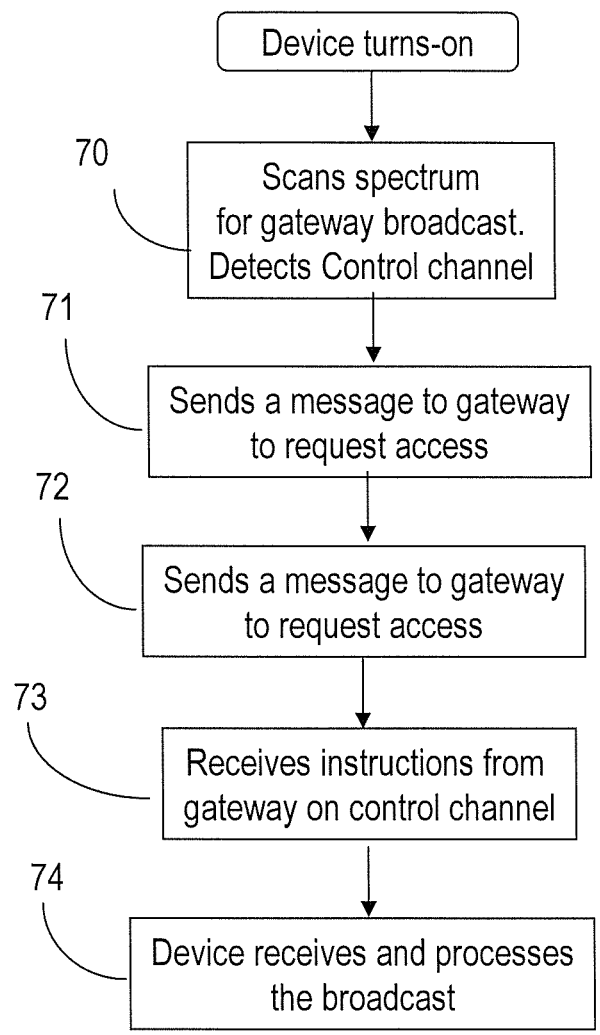
FIG. 6B is a flowchart of the method according to an embodiment of the invention, showing the steps performed by the device.

FIG. 6A is a flowchart of the method according to the invention illustrating the steps performed by a gateway 10. FIG. 6B is a flowchart of the method according to the invention illustrating the steps performed by a device 9 for establishing communication with the gateway over white space identified by gateway 10. FIGS. 6A and 6B are described with reference to block diagram of gateway 10 shown in FIG. 2.

As shown in FIG. 6A, on turn-on, spectrum detector 2 of gateway 10 starts to scan the selected portion/s (band/s) of the wireless communication spectrum, which is, for example, the TV spectrum in bands T2-T5 (see FIG. 1B). This operation is shown by steps 61, 62, and 63, and involves sensing the signals present in the VHF/UHF spectrum, analyzing the sensed signals and detecting the pieces of spectrum that are not currently occupied. The scanning, analyzing and detection operation is repeated at regular intervals, as the spectrum occupancy varies arbitrarily with wireless devices being connected/disconnected to/from the gateway, so that the gateway is aware at all times of the spectrum occupancy at the respective location. At step 61, if a look-up table with the locally allocated channels is available at the gateway, as shown by branch "YES" of decision block 61, the gateway excludes the spectrum occupied by these channels from the scan, as shown at step 62. If not, as shown by branch "NO" of decision block 61, gateway 10 scans the entire TV spectrum, step 63.

Next, the gateway selects the shared signalling channel 5 needed to control the devices through signalling information between the gateway and the devices. This is shown in step 64. As indicated before, the signalling channel enables devices 9 to look for the gateway, for connecting to it, requesting services and receiving instructions.

If gateway 10 receives a connection request from a device 9, as shown in step 65, it will identify and select a white space channel on which to broadcast to device 9, step 66. The white space channels are allocated based on the available spectrum sensed in steps 61-63, and this operation takes into account the bandwidth necessary for the requested service (in the exemplary case of an ATSC channel, the bandwidth necessary is 6 MHz, and can be available as a single piece or made from a plurality of white space pieces). Once the white space channel is selected, the gateway informs device 9 on the parameters of this channel over the signalling channel, step 67. In this way, the devices are informed of the frequency, start time, current bandwidth allocation, duration etc. This information is preferably in the form of bit maps, and enables the gateway and devices to transmit starting from the designated time and frequency grids, rather than arbitrarily.

Next, in step 68, the gateway starts broadcasting data to the device/s, as shown, using the frequency-time grid received from the gateway. As indicated above, since the grids are synchronized with the ATSC broadcast the interference is reduced to conform to the FCC requirements. This is further possible since the power of the signals transmitted by the gateway is very small.

At the same time, gateway 10 reserves the respective white channel, step 66, and provides the neighbouring gateways with the information about the white space it reserved, step 69. As indicated above, this is accomplished using the common spectrum reservation OFDM symbol. The reservation stays active during the entire life of the connection. It is to be noted that step 69 is repeated at regular intervals of time, to update the neighbouring gateways with the current white space reservation information as devices at the location served by gateway 10 change their state between active, idle and inactive.

FIG. 6B is a flowchart of the method according to an embodiment of the invention, showing the steps performed by a device 9. In step 70 the device, which has been powered up, scans the spectrum for any gateway broadcast and detects the signalling channel 5. Once channel 5 is detected, device 9 sends to the gateway a request for a connection and service over this channel, step 71. Once the connection has been established, the device requests a certain service, step 72. If, for example, a user wishes to connect to TV channel 7, it sends to the gateway a join signal that specifies TV channel 7. The gateway has the current spectrum occupancy information, as provided by the spectrum detector 2. Using this data, the gateway allocates to device 9 a white-space channel available for broadcasting channel 7 to the device, and transmits instructions to the device as how and where to receive the requested multimedia media content. In step 73, the device receives these instructions from the gateway 10 and in step 74 it receives the signal and processes it to extract the multimedia content.

We claim:

1. A data distribution unit for transmitting data signals carrying user data to a wireless enabled device located within a specified area, comprising:

a backhaul interface configured to receive a plurality of data signals from a plurality of signal sources;

a processor configured to select, from the backhaul interface, a data signal from a signal source, convert the data signal to a baseband signal in accordance with a first protocol associated with the wireless enabled device, and partition the baseband signal into component signals based on bands in a white space channel identified in TV spectrum as available for communication in the specified area; and a distributor coupled to the processor, the distributor configured to receive an identification of the white-space channel, and convert the component signals for transmission on the white-space channel, the distributor comprising branches connected to the processor, the branches being tuned on carrier frequencies associated with the white-space channel, and a radio frequency (RF) combiner for combining outputs of the branches at an input of an antenna, wherein the number of component signals is less than or equal to the number of branches.

2. A data distribution unit as in claim 1, wherein the white space channel is formed of a number of cells of TV spectrum that are not currently used in the specified area.

3. A data distribution unit as in claim 2, wherein the identification of the white-space channel includes a carrier frequency, a frequency band, and a time interval for each of the cells.

4. A data distribution unit as in claim 1, wherein the number of component signals is equal to the number of bands in the white space channel.

5. A data distribution unit as in claim 1, wherein the identification of the white-space channel includes a carrier frequency, a frequency band, and a time interval.

6. A data distribution unit as in claim 1, wherein the partition of the baseband signal operates so as to not interfere with any primary service available in the specified area.

7. A method for distribution of data signals carrying user data to a wireless enabled device located within a specified area, comprising:

selecting a data signal from a signal source received via a backhaul connection;

converting the data signal to a baseband signal according to a first protocol associated with the wireless enabled device;

separating the baseband signal into component signals, wherein the number of component signals is equal to the number of bands in a white space channel identified in TV spectrum as available for communication in the specified area;

selecting a carrier frequency for each of the component signals in a part of the TV spectrum that is not currently used by a primary service;

modulating the component signals over a respective carrier frequency; and adjusting powers of the component signals to a respective value.

8. A method as in claim 7, wherein the white space channel is formed of a number of cells of TV spectrum that are not currently used in the specified area.

9. A method as in claim 8, further comprising transmitting the converted component signals on the white-space channel to the wireless enabled device for allowing the wireless enabled device to reproduce the user data.

10. A method as in claim 7, further comprising routing the component signals along the branches of a branch distributor having a number of branches greater than or equal to the number component signals.

11. A method as in claim 10, further comprising providing a signaling channel for enabling the wireless enabled device to transmit and receive messages to and from the distributor.

12. A method as in claim 11, wherein the signaling channel has a carrier frequency selected in a fixed relationship with the beginning of an Advanced Television Systems Committee (ATSC) channel.

13. A method as in claim 7, further comprising synchronizing the converted component signals to a digital TV broadcast signal available in the specified area.

14. A method for distribution of data signals carrying user data to a wireless enabled device located within a specified area, comprising:

receiving a data signal via a backhaul connection;

converting the received data signal to a baseband signal according to a protocol associated with the wireless enabled device;

separating the baseband signal into component signals, the number of component signals equal to a number of bands in a white space channel identified in TV spectrum as available for communication in the specified area; and converting the component signals for transmission to the wireless enabled device on the white-space channel.

15. A method as in claim 14, wherein converting the component signals for transmission on a white-space channel comprises:

up-converting each of the component signals using a respective carrier frequency; and combining the up-converted signals to produce a transmitted signal.

16. A method as in claim 15, wherein the white space channel includes discontinuous frequency bands in multiple TV channels, and the carrier frequencies used for up-converting correspond to the frequency bands.

17. A method as in claim 16, wherein the discontinuous frequency bands include a frequency band having a bandwidth narrower than a TV channel.

* * * * *